US007891449B2

(12) United States Patent
Sanji

(10) Patent No.: US 7,891,449 B2
(45) Date of Patent: Feb. 22, 2011

(54) HYBRID DRIVE APPARATUS

(75) Inventor: Hiroaki Sanji, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 594 days.

(21) Appl. No.: 11/979,821

(22) Filed: Nov. 8, 2007

(65) Prior Publication Data
US 2008/0121446 A1 May 29, 2008

(30) Foreign Application Priority Data
Nov. 27, 2006 (JP) .............................. 2006-318598

(51) Int. Cl.
B60K 6/445 (2007.10)
B60K 6/442 (2007.10)
B60K 6/46 (2007.10)
(52) U.S. Cl. .............................. 180/65.235; 180/65.23; 180/65.245
(58) Field of Classification Search ............. 180/65.21, 180/65.225, 65.23, 65.235, 65.245, 65.25
See application file for complete search history.

(56) References Cited

U.S. PATENT DOCUMENTS

| 6,244,368 | B1 * | 6/2001 | Ando et al. | 180/65.25 |
|---|---|---|---|---|
| 6,343,252 | B1 * | 1/2002 | Asami et al. | 701/113 |
| 6,691,013 | B1 * | 2/2004 | Brown | 701/70 |
| 7,240,751 | B2 * | 7/2007 | Hoare et al. | 180/65.25 |
| 7,363,996 | B2 * | 4/2008 | Kamada et al. | 180/65.21 |
| 2004/0168841 | A1 * | 9/2004 | Ohta et al. | 180/65.2 |
| 2005/0139400 | A1 * | 6/2005 | Gee | 180/65.2 |
| 2006/0086545 | A1 * | 4/2006 | Ito et al. | 180/65.2 |
| 2006/0249319 | A1 * | 11/2006 | Hoare et al. | 180/65.4 |
| 2007/0029119 | A1 * | 2/2007 | Syed et al. | 180/65.2 |
| 2007/0102209 | A1 * | 5/2007 | Doebereiner | 180/65.4 |
| 2008/0173487 | A1 * | 7/2008 | Kamada et al. | 180/65.4 |

FOREIGN PATENT DOCUMENTS

| JP | A-10-184727 | 7/1998 |
|---|---|---|
| JP | A-10-281239 | 10/1998 |
| JP | A 2000-009215 | 1/2000 |
| JP | A 2000-023313 | 1/2000 |
| JP | A-2000-245013 | 9/2000 |
| JP | A-2002-089307 | 3/2002 |
| JP | A-2005-291330 | 10/2005 |
| JP | A-2005-297727 | 10/2005 |

* cited by examiner

Primary Examiner—J. Allen Shriver, II
Assistant Examiner—John R Olszewski
(74) Attorney, Agent, or Firm—Oliff & Berridge, PLC

(57) ABSTRACT

A hybrid drive apparatus includes a drive apparatus input shaft that is connected to an engine; a rotary electric machine; a transmission that is capable of changing a speed of rotation from a transmission input shaft and outputting a resulting rotation to a transmission output shaft, an output mechanism that connects the transmission output shaft and drive wheels; a drive transfer mechanism that links a rotor of the rotary electric machine and the transmission input shaft; and a clutch that enables interrupting and connecting of drive power between the drive apparatus input shaft and the transmission input shaft, wherein the drive transfer mechanism includes a speed reduction mechanism that reduces a rotation speed from the rotary electric machine and transmits a resulting rotation to the transmission input shaft.

10 Claims, 6 Drawing Sheets

HYBRID DRIVE APPARATUS

INCORPORATION BY REFERENCE

The disclosure of Japanese Patent Application No. 2006-318598 filed on Nov. 27, 2006, including the specification, drawings, and abstract, is incorporated herein by reference in its entirety.

BACKGROUND

The present invention relates to a hybrid drive apparatus.

A hybrid drive apparatus that is provided with a continuously variable transmission, which serves as a transmission, is used, for example, in a FF-type (front engine, front drive) vehicle in order to realize a comparatively small-scale structure. JP-A-2000-023313 and JP-A-2000-009215 describe hybrid drive apparatuses that are structured with two types of drive power sources and a continuously variable transmission.

As shown in FIG. 1 of JP-A-2000-023313, the hybrid drive apparatus is structured by being provided with an engine 2 and a rotary electric machine 3 with the rotor of the rotary electric machine 3 connected to an input shaft 51 of a continuously variable transmission 5. In contrast, the engine 2 is connected to the input shaft 51 of the continuously variable transmission 5 via a first clutch 4. In addition, the output from the continuously variable transmission 5 is transferred to a second clutch 7 and drive wheels 11R and 11L.

Because of the second clutch 7 in the hybrid drive apparatus in JP-A-2000-023313, when the rotation speed ratio of the continuously variable transmission has been held stationary due to, for example, emergency braking or locking of the drive wheels, the stationary state of the continuously variable transmission caused by the drive wheels is released by cutting off the second clutch 7. It is thus possible to make the continuously variable transmission revert to the gear change ratio that is used when the vehicle is starting up.

In the technology that is disclosed in JP-A-2000-023313, when travel is carried out by obtaining drive power from both of the drive power sources, that is, the engine 2 and the rotary electric machine 3, both of the drive powers sources are input as-is into the continuously variable transmission 5. In addition, in the structure in FIG. 1 of JP-A-2000-023313, the first clutch 4 is interposed between the continuously variable transmission 5 (specifically, a drive pulley 53) and the rotary electric machine 3.

FIG. 4 of JP-A-2000-023313 discloses an engine 111, a rotary electric machine 112, and a continuously variable transmission 114 with the rotary electric machine 112 provided on the input shaft of the continuously variable transmission 114. The transfer of the drive power from the engine 111 to the rotary electric machine 112 is realized by a clutch 113 that is provided between the engine 111 and the rotary electric machine 112.

The hybrid drive apparatus that is disclosed in JP-A-2000-009215 is one in which the structure shown in FIG. 4 of JP-A-2000-023313 is maintained. In JP-A-2000-009215, an electromagnetic clutch 11 is provided between an engine output shaft 10 and an input shaft 12 of a continuously variable transmission 13. A rotary electric machine 15 is directly connected to the input shaft 12 of the continuously variable transmission 13, and while the electromagnetic clutch 11 is engaged, all of the drive power from both of the drive power sources is input as-is to the continuously variable transmission 13.

SUMMARY

A hybrid drive apparatus that is provided with two drive power sources (an engine and a single rotary electric machine) and a continuously variable transmission is an apparatus originally developed so as to reduce as far as possible the space that is necessary for the installation thereof. However, there are cases in which the rotary electric machine itself tends to become large due to the drive force that is necessary for travel when using a structure in which shifting is carried out by inputting the output of a drive source (in particular, the rotary electric machine) to the continuously variable transmission as-is and the drive force is thereby transferred to the drive wheels. This is contrary to the objective of downsizing the apparatus.

Furthermore, when a structure is used in which the rotations from both the engine and the rotary electric machine are reduced by the continuously variable transmission, the continuously variable transmission must be made large. There is room for improvement from this viewpoint.

According to an exemplary aspect of the invention, a hybrid drive apparatus includes a drive apparatus input shaft that is connected to an engine; a rotary electric machine; a transmission that is capable of changing a speed of rotation from a transmission input shaft and outputting a resulting rotation to a transmission output shaft, an output mechanism that connects the transmission output shaft and drive wheels; a drive transfer mechanism that links a rotor of the rotary electric machine and the transmission input shaft; and a clutch that enables interrupting and connecting of drive power between the drive apparatus input shaft and the transmission input shaft, wherein the drive transfer mechanism includes a speed reduction mechanism that reduces a rotation speed from the rotary electric machine and transmits a resulting rotation to the transmission input shaft.

BRIEF DESCRIPTION OF THE DRAWINGS

Various exemplary embodiments will be described with reference to the drawings, wherein.

DETAILED DESCRIPTION OF EMBODIMENTS

Below, embodiments of the hybrid drive apparatus HV according to the present invention will be explained with reference to the figures.

First Embodiment

Figure 1:
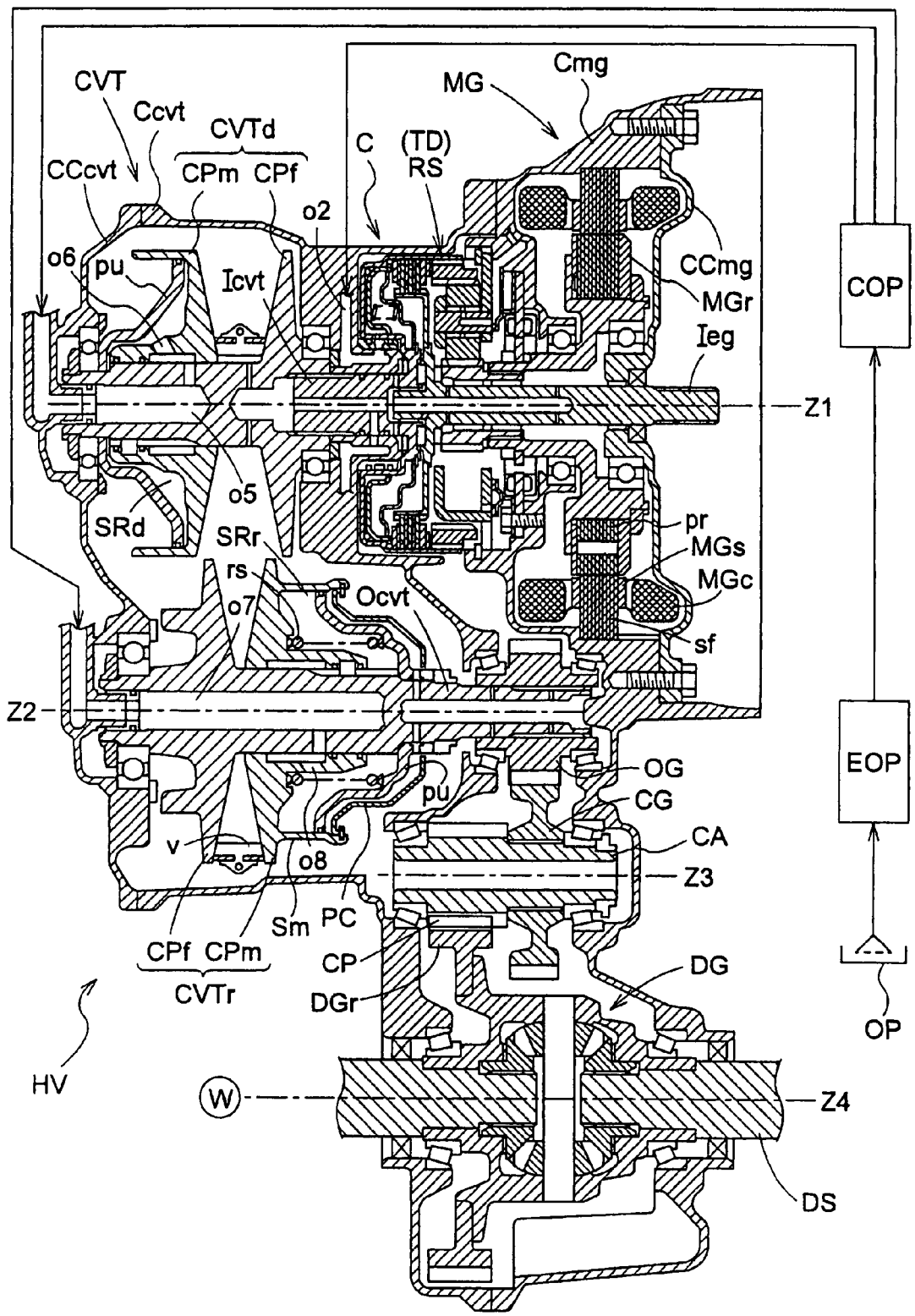
FIG. 1 is a cross-sectional view that shows the structure of the hybrid drive apparatus according to a first embodiment.
Figure 2:
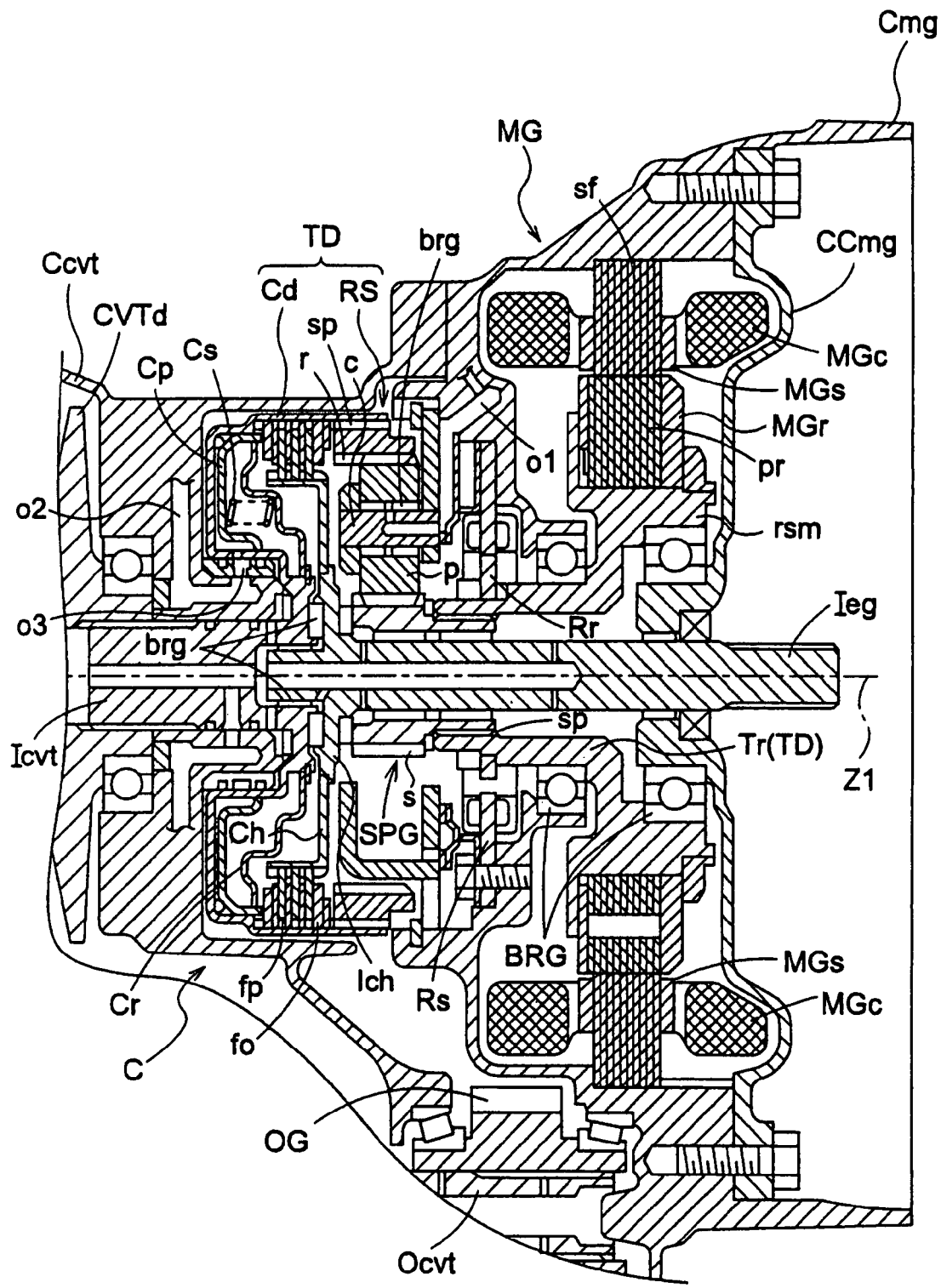
FIG. 2 is a cross-sectional view that shows the structures of main components of the hybrid drive apparatus according to the first embodiment.
Figure 3:
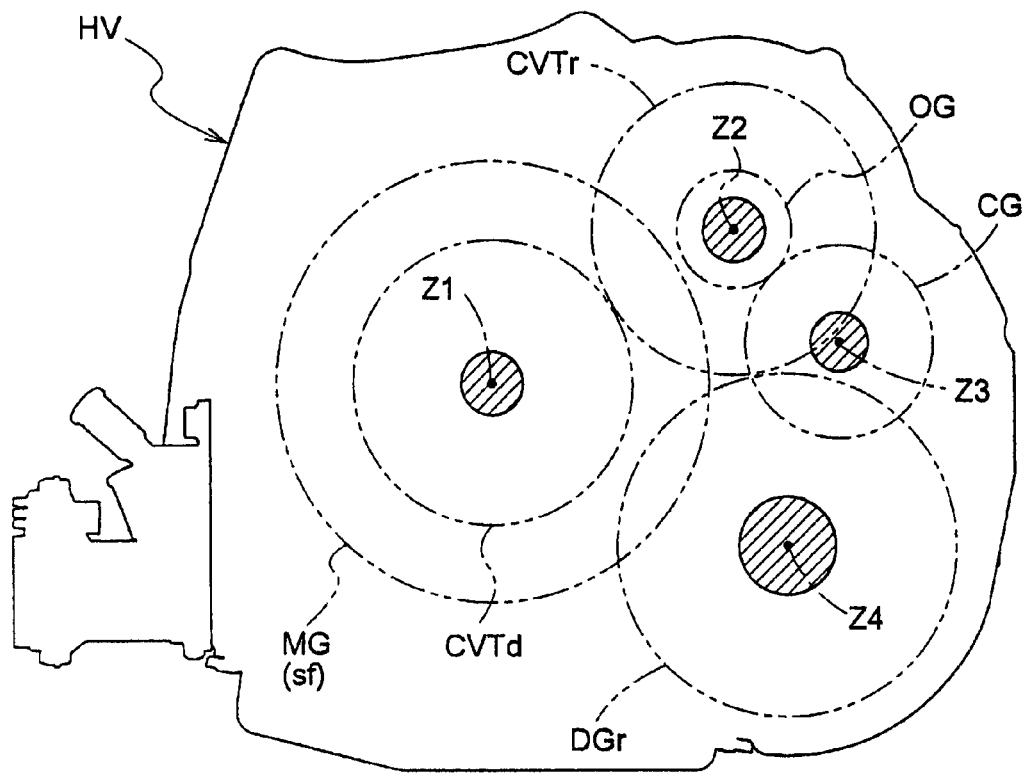
FIG. 3 is a side view that shows the distribution of the main devices of the hybrid drive apparatus according to the first embodiment.
Figure 4:
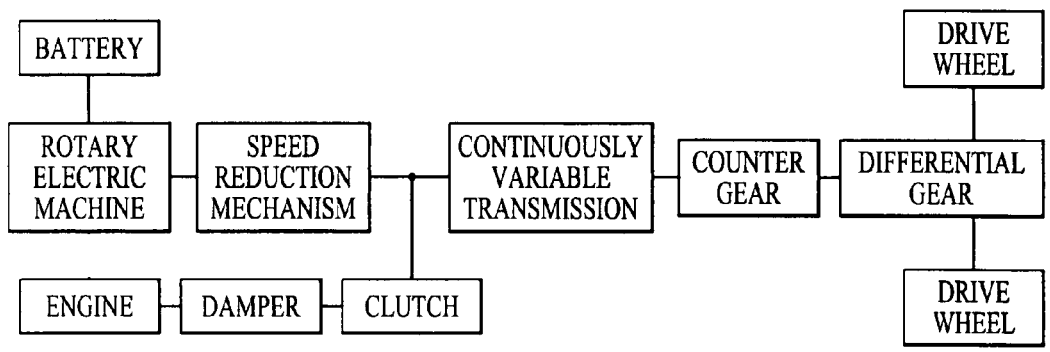
FIG. 4 is a figure that shows an outline of the drive transfer system of the hybrid drive apparatus according to the present application.

FIG. 1 and FIG. 2 are cross-sectional views that show the structure of the hybrid drive apparatus HV, FIG. 3 is a drawing that shows the hybrid drive apparatus HV when viewed in an axial direction, and FIG. 4 is a schematic drawing of the drive train that is used in this hybrid drive apparatus HV.

A vehicle provided with this hybrid drive apparatus HV includes an engine EG (an internal combustion engine such as a gasoline engine or a diesel engine) and a rotary electric machine MG (including a rotary electric machine that operates as a motor that receives electrical power to generate a drive power (rotating drive power), a rotary electric machine that operates as a generator that receives a supply of a drive power to generate electrical power, or a rotary electric machine that operates selectively as a motor or a generator depending on the operating state) that serve as drive sources, and the drive power that is obtained therefrom is input to a transmission (a continuously variable transmission CVT). In addition, in this continuously variable transmission CVT, the input rotation is continuously shifted, and the rotational drive after shifting is transferred to the drive wheels W via a counter gear CG and a differential gear DG.

As schematically shown in FIG. 4, a structure is used in which the rotary electric machine MG is drive linked to the continuously variable transmission CVT via a speed reducing mechanism RS, and a structure is used in which the engine EG is drive linked to the continuously variable transmission CVT via a damper D and a clutch C. Therefore, in this drive train, when the clutch C is in a disengaged state, motor travel can be realized by the rotary electric machine MG operating as a motor. During braking, the rotary electric machine MG operates as a generator, and it is possible to carry out charging of a battery B that is electrically connected to the rotary electric machine MG. In contrast, when the clutch C is in an engaged state, the drive power from the motor MG and the engine EG is transferred to the continuously variable transmission CVT, and it is possible to travel by obtaining the drive power from both drive sources.

FIG. 1 shows the detail of the hybrid drive apparatus HV according to the present application, and shows the disposition and connection structure of the rotary electric machine MG, the speed reduction mechanism RS, the clutch C, the continuously variable transmission CVT, the counter gear CG, and the differential gear DG. FIG. 2 is a drawing that shows the detail in the vicinity of the rotary electric machine MG, the speed reduction mechanism RS, and the clutch C.

This hybrid drive apparatus HV is provided with a drive apparatus input shaft Ieg that is drive linked to the engine EG, a rotary electric machine MG, a continuously variable transmission CVT that continuously varies the rotation that is input from a CVT input shaft Icvt (transmission input shaft) and that can output the resulting rotation to a CVT output shaft Ocvt (transmission output shaft), and an output mechanism that drive links the CVT output shaft Ocvt and the drive wheels W. The output mechanism is structure by being provided with a transmission output gear OG that is provided on the CVT output shaft Ocvt, a counter shaft CA that is provided on the counter gear CG, and a differential gear DG that is provided on a differential ring gear DGr that meshes with a pinion CP that is provided on the counter shaft CA.

In addition, between the rotor MGr of the rotary electric machine MG and the CVT input shaft Icvt, a drive transfer mechanism TD is provided that links both together and enables the transferring of a drive force therebetween. In addition, between the drive apparatus input shaft Ieg and the CVT input shaft Icvt, a clutch C is provided that can interrupt and connect the transfer of the drive force therebetween. The drive transfer mechanism TD is provided with the speed reduction mechanism RS that reduces the speed of the rotation from the rotary electric machine MG, and transfers the resulting rotation to the CVT input shaft Icvt. In the example that is illustrated, a single planetary gear SPG is used as the speed reduction mechanism RS, and furthermore, a clutch drum Cd that forms a portion of the clutch is structured so as to form a portion of the drive transfer mechanism TD.

The axis of the CVT input shaft Icvt is referred to as the "first axis Z1", and the drive apparatus input shaft Ieg and the CVT input shaft Icvt are disposed concentrically on this first axis Z1. In addition, from the engine side, the rotary electric machine MG, the speed reduction mechanism RS (single planetary gear SPG), the clutch C, and a drive pulley CVTd of the continuously variable transmission CVT are disposed concentrically.

Furthermore, in this hybrid drive apparatus HV, the drive apparatus case is provided with a CVT case Ccvt for housing the continuously variable transmission CVT, a MG case (rotary electric machine housing case) Cmg for housing the rotary electric machine MG, a CVT case cover CCcvt for covering the opening (the opening that is provided on the left side in FIG. 1) of the CVT case Ccvt, and a MG case cover CCmg that covers the opening (the opening that is provided on the right side in FIG. 1) of the MG case Cmg and partitions the rotary electric machine MG from the damper D and the engine EG. As shown in the figures, the MG case Cmg is connected to the engine side of the CVT case Ccvt.

An outline of the hybrid drive apparatus HV according to the present application has been described above. In the following, the hybrid drive apparatus HV will be explained in detail.

The Rotary Electric Machine MG

As is well-known, the rotary electric machine MG that is disposed in the MG case Cmg includes a rotor MGr and a stator MGs. The stator MGs is positioned on the outside of the rotor MGr in the radial direction and has coils MGc that project from the rotor MGr in an axial direction. The rotor MGr is structured by a plurality of laminated plates pr that have permanent magnets embedded therein and a rotor support member rsm that fastens and supports these laminated plates pr while arranged in an axial direction.

As is shown in FIG. 1 and FIG. 2, the rotor MGr is supported so as to be able to rotate around the first axis Z1 via a bearing BRG by the MG case Cmg and the MG case cover CCmg. Furthermore, a rotor drive transfer member Tr that extends toward the speed reduction mechanism RS side is provided on this rotor MGr, the rotor drive transfer member Tr is connected by a spline sp to an extended portion on the inner radial side of the sun gear s of the single planetary gear SPG that forms the speed reduction mechanism RS, and the drive power of the rotor MGr is thereby transferred to the sun gear s.

In addition, a plurality of stator cores sf are fastened on the MG case Cmg so as to oppose the laminated plates pr with a slight gap present therebetween, and the stator MGs is structured by coils MGc being wrapped around these stator cores sf.

As can be understood from FIG. 1 and FIG. 2, in the present application, the cross-sections of both the plurality of laminated plates pr, which form the rotor MGr, and the stator cores sf have a width in the first axis Z1 direction that is small and a thickness in the radial direction that is large. As a result, a large capacity for both can be ensured, and thus it is possible to make the rotary electric machine output comparatively large.

The resolver stator Rs is provided inside the MG case Cmg and the resolver stator Rr is provided on the rotor drive transfer member Tr. The resolver is structured by both the resolver stator Rs and Rr, and the rotating position of the rotary electric machine MG can be detected.

The Speed Reduction Mechanism RS

The present example uses a single planetary gear SPG that is provided with a sun gear s that serves as the speed reduction mechanism RS, a carrier c that supports pinions p so as to be able to rotate, and a ring gear r.

In this example, the rotor drive of the rotary electric machine MG is transferred to the sun gear s via the rotor drive transfer member Tr. A structure is used in which the carrier c is supported by the MG case Cmg, and at the same time, the rotation thereof is stopped by the MG case Cmg. That is, the MG case Cmg is the non-rotating member in the present application. The ring gear r is provided on an extended portion that extends from the end of the clutch drum Cd of the clutch C on the engine side, which will be described below. Specifically, the outer radial part of the ring gear r and the inner radial part of the clutch drum Cd are connected by the spline sp so as to rotate integrally. Therefore, the gears r, p, and s of the single planetary gear SPG are disposed from the outer radial part of the clutch drum Cd on the inner radial side, and in the axial direction of the first axis Z1, the ring gear r, the carrier c, and the sun gear s are structured so as to overlap with a part of the extended portion of the clutch drum Cd. As a result, in a structure in which the clutch C and the speed reduction mechanism RS are provided between the continuously variable transmission CVT and the rotary electric machine MG, ample downsizing can be attained. The relationships of the gear ratios between each of the gears r, p, and s are set such that the rotation speed of the sun gear s, which is the input rotating element, is reduced and extracted as the rotation of the ring gear r, which is the output rotating element.

As a result, the drive power that is generated by the rotary electric machine MG is reduced by this speed reduction mechanism RS, the resulting drive power is transferred to the clutch drum Cd, and then transferred to the CVT input shaft Icvt that rotates integrally with the clutch drum Cd. Specifically, the drive transfer mechanism TD according to the present application is structured by the rotor drive transfer member Tr, the speed reduction mechanism RS, and the clutch drum Cd.

In addition, as can be understood from FIG. 1 and FIG. 2, an oil path o1 that communicates from the MG case Cmg into the carrier c and communicates with the bearing housing space that is provided between the pinions p and the carrier c, and is structured such that it is possible thereby to lubricate a bearing brg from the MG case Cmg advantageously. The drive apparatus input shaft Ieg The drive apparatus input shaft Ieg, to which the drive force is transferred from the engine EG, is disposed in the axial center part of the rotary electric machine MG and the speed reduction mechanism RS. This drive apparatus input shaft Ieg serves as the input member of the hybrid drive apparatus HV according to the present application. Fluctuations in the input by this input shaft Ieg are suppressed by providing a damper D between the engine EG and the drive apparatus input shaft Ieg.

As shown in FIG. 1, a structure is used in which this drive apparatus input shaft Ieg is rotatably supported by the MG case cover CCmg, sun gear s of the single planetary gear SPG, which is the speed reduction mechanism RS, and the CVT input shaft Icvt. With respect to the relationship between the drive apparatus input shaft Ieg and the CVT input shaft Icvt, a structure is used in which the end of the drive apparatus input shaft Ieg on the continuously variable transmission CVT side penetrates into the CVT input shaft Icvt, and it is rotatably supported by the CVT input shaft Icvt from the outer radial side via the bearing brg. In the axial direction as well, a structure is used in which the end of the drive apparatus input shaft Ieg is positioned by the CVT input shaft Icvt via the bearing brg.

Furthermore, the drive apparatus input shaft Ieg is structured such that a clutch hub connecting portion Ich is provided in proximity to the end of the drive apparatus input shaft Ieg on the CVT input shaft Icvt side, and the clutch hub Ch, which is provided with a plurality of friction plates fp at the distal end thereof, thereby rotates integrally with this input shaft Ieg.

The Clutch C

The clutch C is structured by being provided with a clutch drum Cd that rotates integrally with the CVT input shaft Icvt and the clutch hub Ch that rotates integrally with the drive apparatus input shaft Ieg, and is further structured by being provided with the plurality of friction plates fp on the outer radial side part of the clutch hub Ch and a plurality of friction mating plates fo on the inner radial side part of the clutch drum Cd at the distal ends. In addition, a piston Cp that is provided in the clutch C moves in the axial direction due to a supply of hydraulic pressure, and the engagement and disengagement of the clutch C are thereby realized. A piston spring Cs is structured such that one end thereof abuts the piston Cp, and the other end thereof abuts a spring retainer Cr, the movement of the spring retainer Cr in the axial direction being stopped by the CVT input shaft Icvt, and a predetermined urging force can be generated thereby. This clutch drum Cd corresponds to the clutch output member.

Engagement of the clutch C is realized by the friction mating plates for pressing against the friction plates fp, while the piston Cp moves toward the clutch hub Ch side overcoming the urging force of the piston spring Cs, due to a hydraulic fluid being supplied between the clutch drum Cd and the piston Cp. In contrast, disengagement is realized by interrupting the supplied pressure of the hydraulic fluid and the piston Cp moving in a direction of separation from the clutch hub Ch due to the urging force of the piston spring Cs.

Due to this structure, while the clutch C is engaged, the drive power from the drive apparatus input shaft Ieg is transferred to the CVT input shaft Icvt via the clutch C.

The hydraulic pressure for engagement and disengagement is supplied between the clutch drum Cd and the piston Cp via an oil duct o2 that is provided in the CVT case Ccvt and an introduction path o3 that is provided in the clutch drum Cd.

The Continuously Variable Transmission CVT

As shown in FIG. 1, the continuously variable transmission CVT includes, for example, a drive pulley CVTd, a driven pulley CVTr, and a V-belt v that transfers the rotational power of the drive pulley CVTd to the driven pulley CVTr.

The drive pulley CVTd includes a fixed cone plate CPf that rotates integrally with the drive shaft, which is the CVT input shaft Icvt, and a movable cone plate CPm. The movable cone plate CPm is disposed opposite to the fixed cone plate CPf so as to form a V-shaped pulley groove therebetween and can move in an axial direction of the CVT input shaft Icvt due to hydraulic pressure that acts inside the drive pulley cylinder chamber SRd. A structure is used in which this drive pulley cylinder chamber SRd is formed between a plunger pu that is attached to the end of the drive shaft Icvt, and the movable cone plate CPm. In addition, a structure is used in which the hydraulic pressure is supplied from an oil path o5 that is provided inside the drive shaft Icvt to the drive pulley cylinder chamber SRd via a hydraulic pressure supply opening o6 that is provided in the support portion of the movable cone plate CPm.

The driven pulley CVTr is provided on the CVT output shaft Ocvt, which is a driven shaft. This driven pulley CVTr also includes a fixed cone plate CPf that rotates integrally with the CVT output shaft Ocvt, and a movable cone plate CPm. The movable cone plate CPm is disposed opposite to the fixed cone plate CPf so as to form a V-shaped pulley groove therebetween, and can move in the axial direction of the CVT output shaft Ocvt due to the hydraulic pressure that acts inside the driven pulley cylinder chamber SRr. A structure is used in which this driven pulley cylinder chamber SRr is formed between the plunger pu, which is attached to the middle portion of the CVT output shaft Ocvt, and the movable cone plate CPm, and a structure is used in which a restoration spring rs is interposed between the plunger pu and the back surface of the movable cone plate CPm (the surface on the right side in FIG. 1). In the case of this driven pulley CVTr as well, a structure is used in which the hydraulic pressure is supplied from an oil path o7 that is provided inside the CVT output shaft Ocvt to the driven pulley cylinder chamber SRr via a hydraulic pressure supply opening o8 that is provided in the support portion of the movable cone plate CPm.

Furthermore, at the back surface side of the plunger pu that forms the driven pulley cylinder chamber SRr, a cylindrical cylinder Sm is provided that is formed on the back surface side of the movable cone plate CPm in order to form the driven pulley cylinder chamber SRr inside the inner radial part thereof. In addition, a substantially cylindrical plunger cover PC is provided from the distal end of this cylinder Sm.

Based on this structure, the outer radius of the driven pulley CVTr around the CVT output shaft Ocvt becomes smaller toward the engine side.

By using the structure that has been described above, it is possible to change the rotation ratio, i.e., the speed reduction ratio between the drive pulley CVTd and the driven pulley CVTr by moving the movable cone plate CPm of the drive pulley CVTd and the movable cone plate CPm of the driven pulley CVTr in an axial direction, thereby changing the pitch radius between the cone plates and the V-belt v. For example, if the width of the V-shaped pulley groove of the drive pulley CVTd is increased and the width of the V-shaped pulley groove of the driven pulley CVTr is decreased, the pitch radius of the V-belt v on the driven pulley CVTd side becomes small and the pitch radius of the V-belt on the driven pulley CVTr side becomes large, and thereby a large gear change ratio is obtained. If the movable cone plates CPm and CPm move in directions opposite to those described above, the speed reduction ratio becomes small. The control by which the widths of the V-shaped pulley grooves of such a drive pulley CVTd and driven pulley CVTr are changed is carried out by controlling hydraulic pressure to the drive pulley cylinder chamber SRd or the driven pulley cylinder chamber SRr by a hydraulic control circuit COP via a control system (not illustrated).

The CVT output shaft Ocvt extends toward the engine side (the right side in FIG. 1), and the transmission output gear OG is held stationary by an extended portion thereof. This transmission output gear OG meshes with the counter gear CG of the counter shaft CA. A pinion CP that is provided on the counter shaft CA meshes with the differential ring gear DGr of the differential gear DG. The drive power is transferred from the differential gear DG to the drive wheels W via a drive shaft DS. In the present application, the counter shaft CA, the counter gear CG, and the pinion CP structure the counter mechanism, and the differential gear DG, which is provided with the differential ring gear DGr, forms the differential mechanism.

The positional relationships between the continuously variable transmission CVT, the clutch C, the speed reduction mechanism RS, the rotary electric machine MG, the transmission output gear OG, the counter gear CG, and the differential ring gear DGr are illustrated in FIG. 1.

As is shown in FIG. 1, in the hybrid drive apparatus HV according to the present application, on the first axis Z1, on which the drive apparatus input shaft Ieg and the CVT input shaft Icvt are disposed, from the engine side, the rotary electric machine MG, the speed reduction mechanism RS, the clutch C, and the drive pulley CVTd are disposed. In contrast, on the second axis Z2, on which the CVT output shaft Ocvt is disposed, from the engine side, the transmission output gear OG and the driven pulley CVTr are disposed.

In addition, in the axial direction of the first axis Z1, with respect to the driven pulley CVTr, the clutch C and the speed reduction mechanism RS are disposed at positions that overlap with an intermediate section extending from the plunger pu of the driven pulley CVTr, where the outer diameter of the plunger pu begins to narrow, to the transmission output gear OG, and this significantly contributes to the downsizing of the apparatus. Furthermore, with respect to the relationship between the rotary electric machine MG, the counter gear CG, and the differential ring gear DGr, the position of the stator cores sf and that structure the stator MGs of the rotary electric machine MG is disposed more toward the engine EG side than the position of the counter gear CG that is provided on the counter shaft CA and the position of the differential ring gear DGr that is provided on the differential gear DG.

FIG. 3 is a drawing that shows the positional relationships between the drive pulley CVTd, the rotary electric machine MG, the driven pulley CVTr, the counter gear CG, the differential ring gear DGr, and the transmission output gear OG that are provided in the hybrid drive apparatus HV according to the present application when viewed from the axial end side of the CVT input shaft Icvt and the CVT output shaft Ocvt (viewed from the left side in FIG. 1). In this figure, in addition to the first axis Z1 and the second axis Z2 that have been explained above, a third axis Z3 that shows the axis of the counter shaft CA and a fourth axis Z4 that shows the axis of the differential ring gear DGr are illustrated.

As can be understood from this figure, a structure is used in which, in the left to right direction, the second axis Z2 and the fourth axis Z4 are positioned between the first axis Z1 and the third axis Z3, and in the top to bottom direction, the first axis Z1 and the third axis Z3 are positioned between the fourth axis Z4 and the second axis Z2. Furthermore, the outer radial position of the stator cores sf that are provided in the rotary electric machine MG is in proximity to the outer radial position of the transmission output gear OG. However, as shown in FIG. 1, by making the positions in the axial direction of the first axis Z1 different, it is possible to obtain a small-scale hybrid drive apparatus HV in which the transmission output gear OG, the counter gear CG, and the differential ring gear DGr do not interfere with each other while using a rotary electric machine in which the outer diameter of the rotary electric machine MG made large and output is obtained.

Furthermore, FIG. 1 shows a supply system for supplying a hydraulic fluid and lubricating oil from an oil pan OP via an electrical oil pump EOP and the hydraulic control circuit OP.

Second Embodiment

Below, a second embodiment of the hybrid drive apparatus HV according to the present application will be explained with reference to FIG. 5 and FIG. 6.

In this embodiment as well, a single rotary electric machine MG is provided, and the drive rotation that has been reduced by a speed reduction mechanism RS, which includes a single planetary gear SPG, is input to the CVT input shaft Icvt. In addition, similarly, the drive power from the engine EG is input to the CVT input shaft Icvt while being interrupted and connected by the clutch. In this example as well, a structure is used in which the clutch drum Cd of the clutch C is used to transfer the drive power from the rotary electric machine MG. In addition, the drive power is transferred to the drive wheels W via the counter shaft CA and the differential gear DG after being reduced by the continuously variable transmission CVT.

In the second embodiment, a structure is used in which a mechanical oil pump MOP is provided on the shaft side of the rotary electric machine MG, and a hydraulic oil supply path o10 is provided that supplies the hydraulic fluid to the clutch C and supplies the lubricating oil to other necessary parts that are located around the drive apparatus input shaft Ieg. Furthermore, linking mates for the carrier c and the ring gear r in the speed reduction mechanism RS, which consists of a single planetary gear SPG, are different. Below, these points of difference will be explained.

The Mechanical Oil Pump Mop and The Hydraulic Fluid Supply Path o10.

Figure 5:
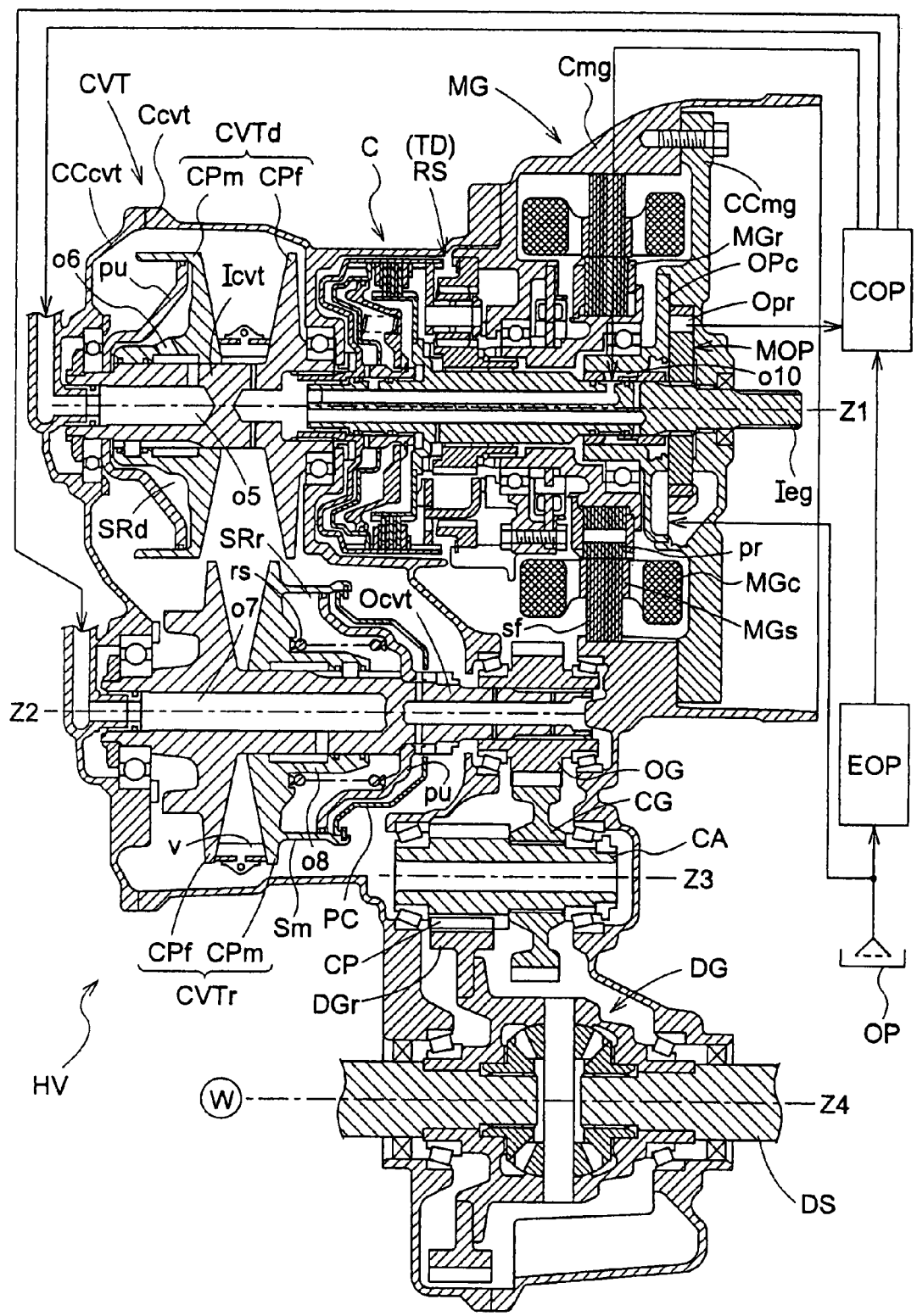
FIG. 5 is a cross-sectional view that shows the structure of the hybrid drive apparatus according to a second embodiment.
Figure 6:
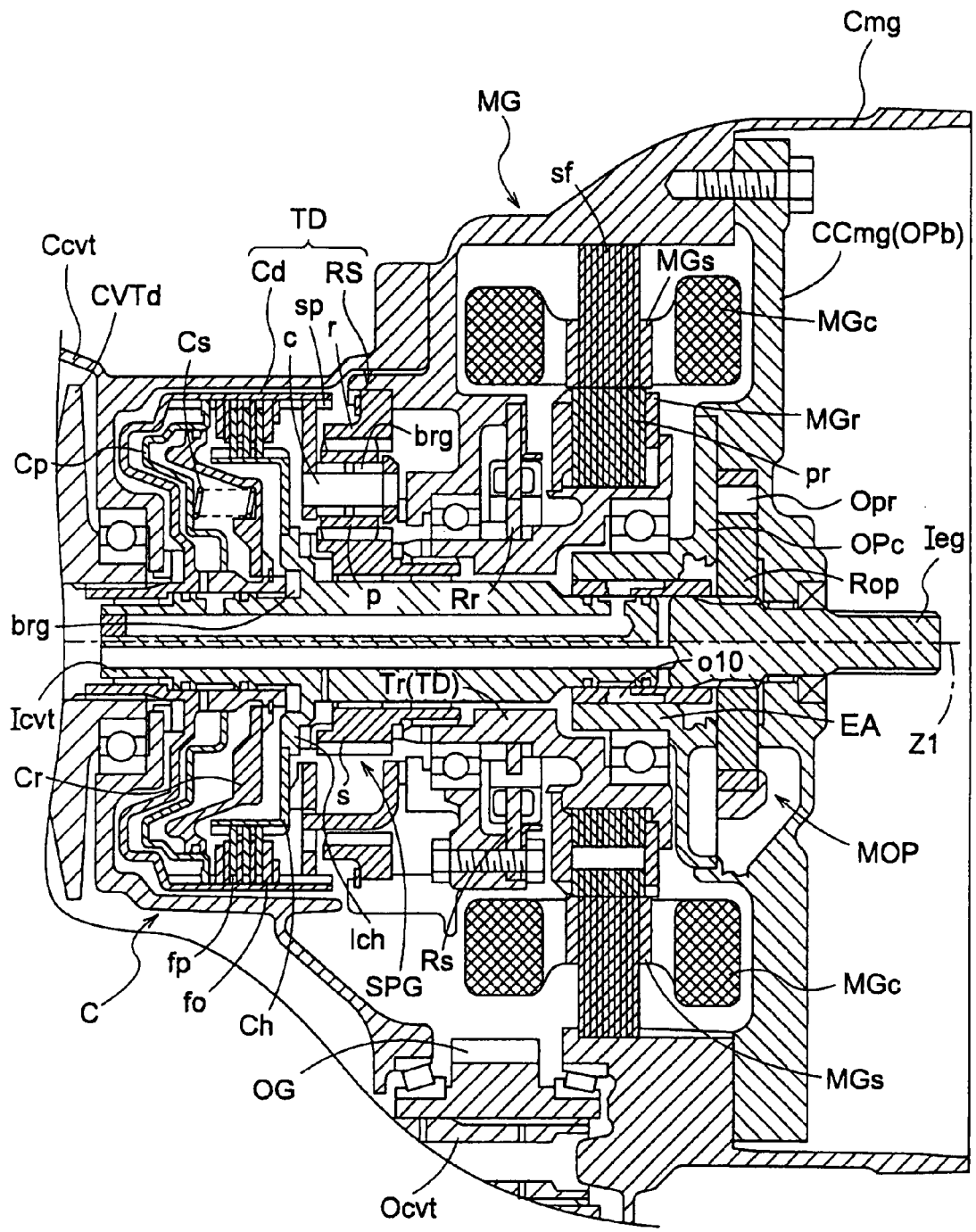
FIG. 6 is a cross-sectional view that shows the structure of main components of the hybrid drive apparatus according to the second embodiment.

As is shown in FIG. 5 and FIG. 6, a concave portion is bored into the rotary electric machine MG side (the side opposed to the engine EG) of the MG case cover CCmg in this embodiment, and structured so that the oil pump cover OPc that covers this concave portion is fastened to the MG case cover CCmg. Thereby, a pump chamber Opr is formed between the MG case cover CCmg and the oil pump cover OPc. Furthermore, a rotor Rop that rotates integrally with the drive apparatus input shaft Ieg is provided in this pump chamber Opr, and this serves as the mechanical oil pump MOP.

Furthermore, the continuously variable transmission CVT side of this oil pump cover OPc extends in a cylindrical shape to form a hydraulic fluid supply path o10 that distributes and supplies oil between this extended portion EA and the drive apparatus input shaft Ieg. In this manner, the space that is positioned on the shaft side of the rotary electric machine MG is effectively used, and it is possible to advantageously feed the hydraulic fluid from the hydraulic fluid supply path o10 to the clutch C via the inside of the drive apparatus input shaft Ieg.

The Speed Reduction Mechanism RS

In the present example as well, a single planetary gear SPG serving as a speed reduction mechanism RS is used that is provided with a sun gear s, a carrier c, which rotatably supports pinions p, and a ring gear s.

In this example as well, the rotational drive of the rotary electric machine MG is transferred to the sun gear s via the rotor drive transfer member Tr. In contrast, a structure is used in which the ring gear r is supported on the MG case Cmg by a spline sp while the rotation thereof is stopped. That is, the MG case Cmg is the non-rotating member in this example as well. At the same time, the carrier c is linked to an extended portion that extends the end of the clutch drum Cd of the clutch C on the engine side. Specifically, an outer diameter part of the carrier c and an inner diameter part of the clutch drum Cd are engaged by the spline sp so as to rotate integrally.

Therefore, in this example as well, a structure is used in which the gears r, p, and s of the single planetary gear SPG are disposed more toward the inner diameter side than the outer diameter part of the clutch drum Cd, and in the axial direction of the first axis Z1, the ring gear r, the carrier c, and the sun gear s overlap with a part of the extended portion of the clutch drum Cd. As a result, ample down-sizing can be attained in a structure that is provided with the clutch C and the speed reduction mechanism RS. The relationships between the gear ratios of each of the gears are set such that the rotation of the sun gear s, which is the input rotating element, is reduced and extracted to serve as the rotation for the carrier c, which is the output rotating element.

As a result, the speed of the rotation that is generated by the rotary electric machine MG is reduced by this speed reduction mechanism RS, the resulting rotation is transferred to the clutch drum Cd, and then transferred to the CVT input shaft Icvt, which is provided so as to rotate integrally with the clutch drum Cd.

In addition, the lubricant for the bearing brg that is provided between the pinions p and the carrier c, which form the speed reduction mechanism RS, is an oil that is fed by centrifugal force from the drive apparatus input shaft Ieg side.

FIG. 5 shows the supply system for the hydraulic fluid and lubricating oil from the oil pan OP via the electric oil pump EOP, the mechanical oil pump MOP, and the hydraulic control circuit COP.

Alternative Embodiments (1) In the embodiments that have been explained above, an example was provided in which the transmission is a continuously variable transmission CVT. However, the structure of the present application can also be used in the case in which a stepped transmission, wherein the gear change ratios change stepwise, is used as the transmission.

(2) In the embodiments that have been explained above, an example was provided in which the hybrid drive apparatus according to the present application was used in a FF-type vehicle. However, this hybrid drive apparatus may be used in a FR-type (front engine, rear drive) vehicle.

(3) In the above embodiments, the clutch drum of a clutch that interrupts and connects the drive transfer between the engine and the transmission input shaft was used in common as the input member for the transmission input shaft. However, the engine side input system, from the engine to the transmission input shaft via a clutch, and the input system, from the rotary electric machine to the transmission input shaft via a speed reduction mechanism, may be separate systems up to the transmission input shaft.

(4) In the above embodiments, in the disposition of devices from the rotary electric machine to the continuously variable transmission, the devices were arranged in the sequence: rotary electric machine, the speed reduction mechanism, clutch, and drive pulley. However, the positional relationships between the speed reduction mechanism and the clutch may be reversed.

(5) In the above embodiments, a single planetary gear was used to structure the speed reduction mechanism, but any type of mechanism that can reduce the speed may be used. However, a planetary gear mechanism, which is exemplified by the single planetary gear, is small and advantageous.

Figure 7:
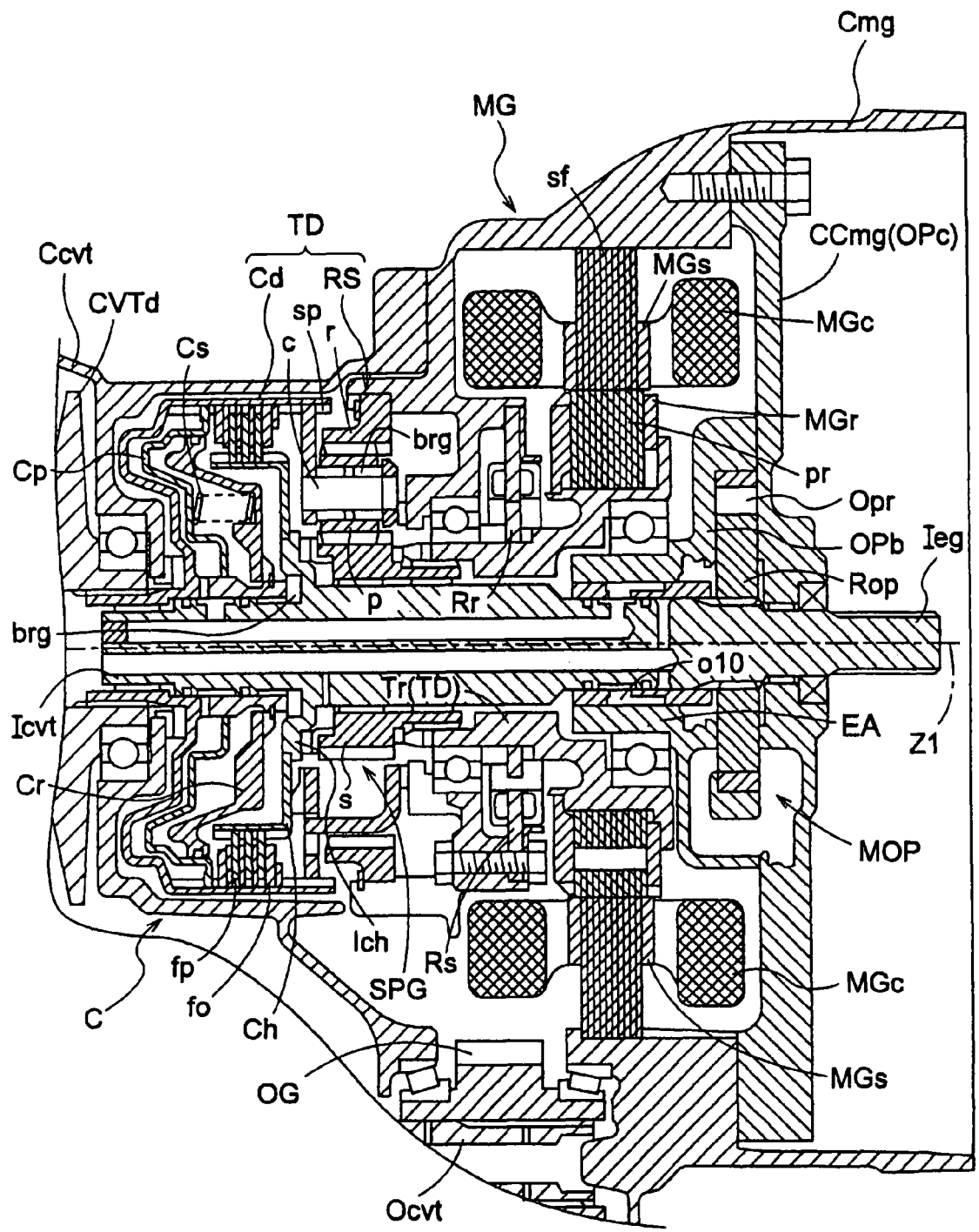
FIG. 7 is a cross-sectional view that shows an alternative example of the structure of main components of the hybrid drive apparatus according to the second embodiment.

(6) Providing the mechanical oil pump described above on the rotary electric machine cover, as is illustrated in the second embodiment, is advantageous. However, the mechanical oil pump may be disposed at any arbitrary position along the drive train system. In addition, in the second embodiment described above, a concave portion was bored into the MG case cover CCmg, as shown in FIG. 6, and this concave portion served as the pump chamber Opr, in which the rotor Rop is disposed. Specifically, in this example, the MG case cover CCmg serves as an oil pump body OPb that houses the rotor Rop, and serves as an oil pump cover OPc that this concave portion covers. In contrast, as is shown in FIG. 7, a pair of members that are disposed on the continuously variable transmission side of the MG case cover CCmg may be provided, and a concave portion may be provided in this member to serve as a pump chamber OPr. In the case of this structure, the pair of members serve as the oil pump body OPb.

Thus, in the present application, the oil pump cover and the oil pump body are referred to as the "oil pump case". In the example that is shown in FIG. 6, the oil pump cover OPc, which serves as the oil pump case, overlaps with at least a portion of the rotary electric machine MG in the axial direction of the first axis Z1, and the hydraulic fluid supply path o10 is provided on the inner diameter side portion of the rotor MGr of the rotary electric machine MG. In the example that is shown in FIG. 7, the oil pump body OPb, which serves as the oil pump case, overlaps with at least a portion of the rotary electric machine MG in the axial direction of the first axis Z1, and the hydraulic fluid supply path o10 is provided on the inner diameter portion of the rotor MGr of the rotary electric machine MG.

The present disclosure thus provides, among other things, a hybrid drive apparatus that has a structure in which both an engine and a rotary electric machine are provided as drive power sources, a rotational drive is obtained from one or both thereof, and this rotational drive is transferred to the drive wheels after being varied by the transmission, wherein it is possible to attain a sufficient drive power for travel even when a comparatively small-sized rotary electric machine is used, and it is possible to downsize the hybrid drive apparatus.

In a hybrid drive apparatus that is provided with an engine and a rotary electric machine as power sources, and in which drive power is obtained from one or both thereof and transferred to the drive wheels after being reduced by the transmission, it is possible to obtain a sufficient drive power even when a comparatively small rotary electric machine is used as the rotary electric machine, and it is possible to make the hybrid drive apparatus as small as possible.

In order to attain the object described above, as a first characteristic structure for a hybrid drive apparatus according to the present invention, which is provided with a drive apparatus input shaft that is connected to an engine, a rotary electric machine, a transmission that can vary the speed of rotation input from a transmission input shaft and output the resulting rotation to a transmission output shaft, and an output mechanism that connects the transmission output shaft and drive wheels, the hybrid drive apparatus includes a drive transfer mechanism that links a rotor of the rotary electric machine and the transmission input shaft; and a clutch that can interrupt and connect the drive transfer between the drive apparatus input shaft and the transmission input shaft, and the drive transfer mechanism includes a speed reduction mechanism that reduces the speed of rotation from the rotary electric machine and transfers the resulting rotation to the transmission input shaft.

Here, the term "connect" denotes a state in which the transfer of drive power is enabled between members that are the object of connection, and includes, in addition to a state in which both of these members are directly connected, a state in which both of these members are indirectly connected via another member.

In this hybrid drive apparatus, the drive power is transferred between the rotor of the rotary electric machine and the transmission input shaft via the drive transfer mechanism. Specifically, when the rotary electric machine is operating as a motor, the drive power that is generated thereby is transferred to the continuously variable transmission. In contrast, in the state in which braking is applied to the drive wheels, the rotary electric machine operates as a generator. Furthermore, by engaging the clutch, a state in which the drive force from the engine is mainly transferred to the transmission is realized. Furthermore, it is also possible to realize a state in which engine braking is applied.

In the hybrid drive apparatus according to the present application, the drive transfer mechanism is provided with a speed reduction mechanism, and the speed of rotation from the rotary electric machine is transferred to the transmission input shaft after being reduced. Therefore, when a design in which the torque that is transferred to the transmission input shaft may be identical to that of a conventional structure, the required rotary electric machine may be small. Alternately, when the rotary electric machine is used that has a substantially identical capacity (i.e., the size is substantially identical), it is possible to obtain a large torque downstream of the drive transfer mechanism.

Furthermore, in this structure, the rotation from the rotary electric machine is not input to the transmission directly. Rather, the rotation speed range of the transmission is limited because the drive that is input to the transmission has been reduced by the speed reduction mechanism. Therefore, it is possible to make the transmission itself small, and although compact, it is possible to obtain a hybrid drive apparatus that can cover an ample travel drive range.

As a second characteristic structure, preferably the structure described above is provided with the drive apparatus input shaft and the transmission input shaft that are disposed concentrically on a first axis, and in the axial direction of the first axis, the clutch and the speed reduction mechanism are provided between the transmission and the rotary electric machine.

In this structure, by providing the clutch and the speed reduction mechanism between the transmission and the rotary electric machine, the position of the rotary electric machine can be adequately separated from the transmission in the axial direction. That is, it is possible to dispose the transmission output gear at the placement position of the clutch and the speed reduction mechanism, and it is thereby possible to avoid interference between the position of the output gear and the position of the rotary electric machine. Thus, the outer diameter of the rotary electric machine can be made large.

In addition, by positioning the clutch and the speed reduction mechanism in the space that is formed between the transmission and the rotary electric machine, it is possible to house each device without wasted space, and it is possible to realize a compact structure.

Furthermore, it is possible to realize a drive train that has a simple structure and a high reliability even for a drive train that is between the rotary electric machine and the transmission by disposing the devices in the following sequence: rotary electric machine, speed reduction mechanism, and transmission.

Furthermore, when the transmission is a continuously variable transmission (CVT), the following operations and effects are attained.

Specifically, a continuously variable transmission is generally structured by providing the necessary devices between a pair of axes, that is, a first axes on which a drive pulley is disposed and a second axis on which a driven pulley is disposed, and in the case in which a structure is used in which the drive is transferred from the engine side to the drive pulley side, the driven pulley (second axis) side is structured such that the transmission output shaft projects toward the engine side (the engine side with respect to the driven pulley). Therefore, the driven pulley, the associated devices thereof, and the transmission output gear are positioned on the second axis side, and these associated devices and the transmission output gear are positioned on the engine side. In addition, in this structure, when the rotary electric machine is disposed on the engine side with respect to the drive pulley, and furthermore, the clutch and the speed reduction mechanism are positioned on the engine side, the outermost radial position of the rotary electric machine in the radial direction is restricted by the transmission output gear. In addition, the drive transfer from the rotary electric machine to the continuously variable transmission returns to the continuously variable transmission side after having been output to the engine side once.

For such a structure, by disposing the clutch and the speed reduction mechanism between the drive pulley and the rotary electric machine, the position of the rotary electric machine can be set at a position that is adequately separated from the continuously variable transmission in an axial direction. Therefore, it is possible to dispose the rotary electric machine at a position that is effectively separated from the transmission output gear in an axial direction, and it is possible to enlarge the outer diameter of the rotary electric machine.

When such a structure is used, a structure in which the devices are disposed from the engine side toward the transmission in the following sequence is preferable: rotary electric machine, speed reduction mechanism, clutch, and transmission.

Because the rotary electric machine and the speed reduction mechanism are in proximity, the structure up to the point at which the reduced speed is output can be a simple and an efficient mechanism, and can be made compact.

Furthermore, in a structure that provides, in the output mechanism, a counter mechanism, which is connected to the transmission output shaft, and a differential mechanism, which is connected to the counter mechanism, and wherein the differential mechanism and the drive wheels are connected, in the axial direction of the first axis, preferably the position of the stator core of the rotary electric machine is disposed more toward the engine side than the position of a counter gear that is provided in the counter mechanism and the position of a differential ring gear that is provided in the differential mechanism.

In this structure, the position of the stator core of the rotary electric machine is set more toward the engine side than the positions of the counter gear (in other words, the transmission output gear) and the differential ring gear, and thereby, it becomes possible to enlarge the outer diameter of the stator core. Thus, even when a rotary electric machine is used that has a comparatively large output, it is possible to limit the thickness in the axial direction.

In the structure that has been explained above, preferably, a structure is used in which a clutch output member of the clutch is connected to the transmission input shaft, and the reduced rotation from the speed reduction mechanism is transferred to the transmissions input shaft via the clutch output member.

With this structure, it is possible to use the clutch output member to transfer the output from the speed reduction mechanism to the transmission, it is possible to increase the reliability by simplifying the structure, and it is possible to reduce the number of parts.

In the structure that uses the clutch output member in common as described above, preferably, the clutch is structured by being provided with a clutch drum that serves as a clutch output member and a clutch hub that serves as a clutch input member, the speed reduction mechanism is a planetary gear mechanism, and an output rotating element of the planetary gear mechanism and the clutch drum are connected.

When this structure is used, the clutch drum can be used in common for both transferring the drive from the engine to the transmission and transferring the drive from the rotary electric machine to the transmission. Furthermore, it is possible to use a structure in which a speed reduction mechanism is disposed on the opening side of the clutch drum.

In addition, in the structure that can use the clutch output member in common as described above, preferably the clutch is structured by being provided with a clutch drum that serves as the clutch output member and a clutch hub that serves as a clutch input member, the speed reduction mechanism is a planetary gear mechanism, and gears that structure the planetary gear mechanism are disposed more toward the inner radial side than an outer radial part of the clutch drum.

With this structure, the speed reduction mechanism is structured by a comparatively simple planetary gear mechanism, and furthermore, the gears that structure this planetary gear mechanism are positioned more toward the inner radial side than the outer radial part of the clutch drum, and thereby, it is possible to realize a compact drive train in which an outer radial part of the clutch is located at the outermost radial position.

In the hybrid drive apparatus that has been explained above, preferably, the speed reduction mechanism is a single planetary gear that is provided with a sun gear, a carrier, and a ring gear, the rotor of the rotary electric machine is connected to the sun gear, the carrier is linked to a non-rotating member, and the ring gear is an output rotating element.

Here, the expression "linked to a non-rotating member" denotes the rotation being stopped by being indirectly linked to a non-rotating member, in addition to the rotation being stopped by being directly linked to a non-rotating member.

Because a single planetary gear is used as the speed reduction mechanism, ample speed reduction can be carried out while suppressing to a minimum the volume of the dedicated space that is necessary for speed reduction. Furthermore, because the carrier is linked to a non-rotating member and the rotation thereof is stopped, although the rotation directions of the sun gear and the ring gear are opposite to each other, the rotation speed (the absolute value of the speed of the clockwise rotation or the counterclockwise rotation) of the gears other than the carrier can be maintained within a comparatively limited range, and this is advantageous in terms of lubrication and the like.

At the same time, in the hybrid drive apparatus that has been explained above, preferably, the speed reduction mechanism is a single planetary gear that is provided with a sun gear, a carrier, and a ring gear, the rotor of the rotary electric machine is connected to the sun gear, the ring gear is linked to a non-rotating member, and the carrier is an output rotating element.

By using a single planetary gear as the speed reduction mechanism, ample speed reduction can be carried out while limiting to a minimum the volume of the dedicated space that is necessary for speed reduction. Furthermore, by linking the ring gear to a non-rotating member and stopping the rotation thereof, a significant speed reduction can be carried out while the rotation directions of the sun gear and the carrier are identical. In addition, this structure can be easily realized simply by holding stationary, on a non-rotating member, the ring gear, which is the outermost radial part.

Preferably, the structure that has been explained above includes: a rotary electric machine housing case which houses the rotary electric machine in the assembled state, and is provided with an engine side opening that opens toward the engine side; a rotary electric machine cover that covers the engine side opening of the rotary electric machine housing case in a state where the drive apparatus input shaft passes through the engine side opening; and a mechanical oil pump that operates by obtaining the drive power from the drive apparatus input shaft and that is provided in the rotary electric machine cover.

The mechanical oil pump, which operates by obtaining the drive power from the drive apparatus input shaft, can be provided in a rotary electric machine cover. In addition, this mechanical oil pump can be positioned, with respect to the rotary electric machine, at the outer radial side of the stator coil thereof, and thus it is possible to use the space that is formed at the inner radial side of the stator coil effectively.

Furthermore, preferably, an oil pump case that forms a portion of the mechanical oil pump is installed on the rotary electric machine cover, and a hydraulic fluid supply path, which feeds a hydraulic fluid to the clutch via the inside of the drive apparatus input shaft, is provided in the oil pump case.

By being structured in this manner, it is possible to realize a hydraulic fluid supply path by using the oil pump case.

Furthermore, preferably, with respect to the oil pump case, this oil pump case overlaps with at least a portion of the rotary electric machine in the axial direction of the first axis.

In the rotary electric machine, when designed to obtain a large output, the diameters of the rotor and the stator become comparatively large. As a result, in this structure, at the inner radial side of the rotary electric machine, an open space is formed more toward the outer radial side than the drive apparatus input shaft. However, because the oil pump case enters at this location and the hydraulic fluid path is provided, the open space can be effectively used.

More specifically, with respect to the rotor of the rotary electric machine, it is also possible to use a structure in which the hydraulic fluid path is provided in a part of the rotor thereof on the inner radius side.

What is claimed is:

1. A hybrid drive apparatus, comprising:
    a drive apparatus input shaft that is connected to an engine;
    a rotary electric machine;
    a transmission that is capable of changing a speed of rotation from a transmission input shaft and outputting a resulting rotation to a transmission output shaft;
    an output mechanism that connects the transmission output shaft and drive wheels;
    a drive transfer mechanism that links a rotor of the rotary electric machine and the transmission input shaft; and
    a clutch that enables interrupting and connecting of drive power between the drive apparatus input shaft and the transmission input shaft, wherein:
        the drive transfer mechanism includes a speed reduction mechanism that reduces a rotation speed from the rotary electric machine and transmits a resulting rotation to the transmission input shaft,
        the drive apparatus input shaft and the transmission input shaft are disposed concentrically on a first axis, and in an axial direction of the first axis, the clutch and the speed reduction mechanism are provided between the transmission and the rotary electric machine,
        from an engine side, the rotary electric machine, the speed reduction mechanism, the clutch, and the transmission are disposed in sequence,
        the clutch comprises a clutch drum that serves as a clutch output member, and the clutch drum is connected to the transmission input shaft,
        the speed reduction mechanism is disposed on an opening side of the clutch drum, and a rotation speed from the speed reduction mechanism is transferred to the transmission input shaft via the clutch drum, and
        the clutch comprises a clutch hub that serves as a clutch input member, and the clutch hub rotates integrally with the drive apparatus input shaft.

2. The hybrid drive apparatus according to claim 1, further comprising:
    a counter mechanism that is connected to the transmission output shaft; and
    a differential mechanism that is connected to the counter mechanism, wherein:
        the counter mechanism and the differential mechanism are provided in the output mechanism,
        the differential mechanism and the drive wheels are connected, and
        in the axial direction of the first axis, a position of a stator core of the rotary electric machine is disposed more toward an engine side than a position of a counter gear that is provided in the counter mechanism and a position of a differential ring gear that is provided in the differential mechanism.

3. The hybrid drive apparatus according to claim 1, wherein:
    the speed reduction mechanism is a planetary gear mechanism, and an output rotating element of the planetary gear mechanism and the clutch drum are connected.

4. The hybrid drive apparatus according to claim 1, wherein:
    the speed reduction mechanism is a planetary gear mechanism, and gears that form the planetary gear mechanism are disposed more toward an inner radial side than an outer radial part of the clutch drum.

5. The hybrid drive apparatus according to claim 1, wherein:
    the speed reduction mechanism is a single planetary gear that comprises a sun gear, a carrier, and a ring gear, the rotor of the rotary electric machine is connected to the sun gear, the carrier is linked to a non-rotating member, and the ring gear is an output rotating element.

6. The hybrid drive apparatus according to any one claim 1, wherein:
    the speed reduction mechanism is a single planetary gear that comprises a sun gear, a carrier, and a ring gear, the rotor of the rotary electric machine is connected to the sun gear, the ring gear is linked to a non-rotating member, and the carrier is an output rotating element.

7. The hybrid drive apparatus according to any one of claim 1, comprising:
    a rotary electric machine housing case that houses the rotary electric machine in an assembled state, and which is provided with an engine side opening that opens toward an engine side;
    a rotary electric machine cover that covers the engine side opening of the rotary electric machine housing case in a state where the drive apparatus input shaft penetrates the engine side opening; and a mechanical oil pump that is activated by obtaining drive power from the drive apparatus input shaft and that is provided in the rotary electric machine cover.

8. The hybrid drive apparatus according to claim 7, wherein:
an oil pump case that forms a portion of the mechanical oil pump is installed on the rotary electric machine cover; and
a hydraulic fluid supply path that feeds hydraulic fluid to the clutch via the inside of the drive apparatus input shaft is provided in the oil pump case.

9. The hybrid drive apparatus according to claim 8, wherein, in the axial direction of the first axis, the oil pump case overlaps with at least a portion of the rotary electric machine.

10. The hybrid drive apparatus according to claim 9, wherein the hydraulic fluid supply path is disposed, with respect to the rotor of the rotary electric machine, at an inner radial side part of the rotor.

* * * * *